United States Patent
Leu (10) Patent No.: US 10,409,924 B2
(45) Date of Patent: Sep. 10, 2019

(54) INTELLIGENT CAA FAILURE PRE-DIAGNOSIS METHOD AND SYSTEM FOR DESIGN LAYOUT

(71) Applicant: ELITE SEMICONDUCTOR, INC., Hsinchu County (TW)

(72) Inventor: Iyun Leu, Hsinchu (TW)

(73) Assignee: ELITE SEMICONDUCTOR, INC., Hsinchu County (TW)

( * ) Notice: Subject to any disclaimer, the term of this patent is extended or adjusted under 35 U.S.C. 154(b) by 125 days.

(21) Appl. No.: 15/684,929

(22) Filed: Aug. 23, 2017

(65) Prior Publication Data

US 2018/0293334 A1    Oct. 11, 2018

(30) Foreign Application Priority Data

Apr. 5, 2017  (TW) .............................. 106111402 A (51) Int. Cl.
*G06F 17/50*  (2006.01)

(52) U.S. Cl.
CPC ...... *G06F 17/5004* (2013.01); *G06F 17/5068* (2013.01); *G06F 17/5081* (2013.01); *G06F 2217/12* (2013.01)

(58) Field of Classification Search
CPC ............. G06F 17/5004; G06F 17/5068; G06F 17/5081
USPC .......................................................... 716/52
See application file for complete search history.

(56) References Cited

U.S. PATENT DOCUMENTS

| | | | |
|---|---|---|---|
| 2003/0060985 A1* | 3/2003 | Mugibayashi | H01L 22/20 702/35 |
| 2003/0120459 A1* | 6/2003 | Lee | H01L 22/20 702/181 |
| 2004/0254752 A1* | 12/2004 | Wisniewski | H01L 22/20 702/84 |
| 2008/0092095 A1* | 4/2008 | Lanzerotti | H01L 22/20 702/185 |
| 2008/0294281 A1* | 11/2008 | Shimshi | G05B 19/41875 700/110 |
| 2008/0295047 A1* | 11/2008 | Nehmadi | G06F 17/5068 716/136 |
| 2017/0212168 A1* | 7/2017 | Leu | G01R 31/31703 |
| 2019/0026419 A1* | 1/2019 | Leu | G06F 17/5081 |

* cited by examiner

*Primary Examiner* — Suchin Parihar
(74) *Attorney, Agent, or Firm* — Li & Cai Intellectual Property (USA) Office (57) ABSTRACT

The instant disclosure provides an intelligent CAA (Critical Area Analysis) failure pre-diagnosis system and method for a design layout. The intelligent CAA failure pre-diagnosis method includes the steps of obtaining a design layout of an object and defining at least one layout region having a layout pattern thereon, obtaining a plurality of defects, comparing the defects one-by-one to a predetermined portion of the layout pattern in the order of their sizes, and calculating a CAA failure risk level of the layout region according to the comparison result.

13 Claims, 9 Drawing Sheets

| data group based on a CAA | | | |
|---|---|---|---|
| defect coordinates | defect size (nm) | defect shape (shape ratio) | Killer defect index (CAA) |
| $C_s$ | 10 | 1.0 | 0 |
| $C_i$ | 10 | 1.1 | 0 |
| $C_i$ | ⋮ | ⋮ | ⋮ |
| $C_i$ | 10 | 10 | 0 |
| $C_i$ | 15 | 1.0 | 0 |
| $C_i$ | 20 | 1.0 | 0.01 |
| $C_i$ | 25 | 1.0 | 0.5 |
| $C_i$ | 30 | 1.0 | 1.0 |
| $C_e$ | 31 | 1.0 | 1.0 |

FIG. 12

| data group based on a CAA | | | |
|---|---|---|---|
| defect coordinates | defect size (nm) | defect shape (shape ratio) | Killer defect index (CAA) |
| $C_s$ | 10 | 1.0 | 0 |
| $C_i$ | 10 | 1.1 | 0 |
| $C_i$ | ⋮ | ⋮ | ⋮ |
| $C_i$ | 10 | 10 | 0 |
| $C_i$ | ⋮ | ⋮ | 0 |
| $C_i$ | 40 | 1.0 | 0 |
| $C_i$ | 50 | 1.0 | 0.01 |
| $C_i$ | 51 | 1.0 | 0.1 |
| $C_i$ | 55 | 1.0 | 0.5 |
| $C_i$ | 60 | 1.0 | 1.0 |
| $C_e$ | 61 | 1.0 | 1.0 |

INTELLIGENT CAA FAILURE PRE-DIAGNOSIS METHOD AND SYSTEM FOR DESIGN LAYOUT

BACKGROUND

1. Technical Field

The instant disclosure relates to a product failure analyzing method, and in particular, to an intelligent CAA failure pre-diagnosis method and system for design layout which can accurately predict the failure risk of a product.

2. Description of Related Art

Generally, a design house provides an integrated circuit design layout to a wafer fab (or a manufacturing plant) and then the manufacturing plant uses hundreds types of equipment for manufacturing a large amount of chips based on the design layout. During the manufacturing process, defects such as random particle defect, defects resulted from the manufacturing process or systematic defects are unavoidably presented in the products and cause open or short circuit failure, or affect the yield of the product. The manufacturing plant has carried out several simulations based on various detecting tools for detecting systematic defects and random defects under the primary procedure during the manufacturing process, thereby increasing the yield of the product by modifying the design or improving the manufacturing process.

As the characteristic size in the design layout becomes smaller, the defects affecting the yield of the products become slighter. Therefore, in order to capture all of the killer defects on the wafer, the manufacturing plant must employ scanning and detecting devices having improved sensitivity, and hence, the number of defects that are detected increases. However, among the detected defects, the percentage of the minor defects increases while the total number of the defects increases. In order to identify the potential defects, the manufacturing plant takes photos, inspects and categorizes the sampled and detected defects by an scanning electron microscope (SEM). However, due to the limited manufacturing time and the performance of the electronic microscope (for example, the number of defect observed by the microscope on each wafer is limited), the existing art cannot fulfill different requirements proposed by the customers while meeting the delivery time. Moreover, the important and killer defects on the product are hard to be identified and the risk of failing to identify the killer defect still exists.

Without a fast and inventive method for predicting the systematic defect and random defect, the wafer fab faces problems regarding significantly reduced yield and large amount of learning time for mass production.

SUMMARY

The problem to be solved of the instant disclosure is that there is a need for an intelligent CAA failure pre-diagnosis method and system for design layout which can rapidly and accurately predict if the in-line random defect and systematic defect will lead to failures on the object or affect the yield of the object.

An embodiment of the instant disclosure provides an intelligent critical area analysis (CAA) failure pre-diagnosis system including a region defining module, a defect generating module, an analysis module and a judging module. The region defining module is for defining at least a layout region on a design layout of an object, in which the layout region has a layout pattern. The defect generating module is for obtaining a plurality of defect information in advance, in which each of the defect information includes a defect pattern of a defect, and a defect size and a defect shape related to the defect. The analysis module is for analyzing the critical area for the defect pattern of each of the defects superposed with a predetermined portion of the design layout one-by-one in order of the defect size, thereby obtaining a killer defect index, i.e., a CAA value, related to each of the defects. The judging module is for judging a failure level of the layout region based on the plurality of killer defect indices.

Another embodiment of the instant disclosure provides an intelligent critical area analysis failure pre-diagnosis method including: obtaining a design layout of an object; defining at least a layout region on the design layout, in which the layout region has a layout pattern; obtaining a plurality of defect information in advance, in which each of the defect information includes a defect pattern of a defect, and a defect size and defect shape related to the defect; analyzing the critical area for the defect patterns of the plurality of defects with a predetermined portion of the layout pattern one-by-one in order of size for obtaining a killer defect index, i.e., a CAA value related to each of the defects; and judging a failure risk level of the layout region based on the plurality of killer defect indices.

The advantage of the instant disclosure is that the intelligent critical area analysis (CAA) failure pre-diagnosis system and method is that the system and the method can timely diagnose all of the layout regions with high, medium, low or no failure risk before the manufacturing process, and rapidly and accurately predict if the in-line random defects and system defects would lead to open circuit or short circuit failure on the object to be processed and affects the yield of the object based on the technical feature of "defining at least a layout region on a design layout; obtaining a plurality of defect information in advance; carrying out a critical area analysis (CAA) comparison between the plurality of defects and a predetermined portion of the layout pattern one-by-one in order of size; and judging a failure risk level of the layout region based on the result of the comparison".

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

During the manufacturing processes in the fabrication plants such as the semiconductor fabrication plants, the flat-panel display fabrication plants, the assembly fabs, the solar cell panel fabrication plants, the printed circuit board fabrication plants, the photomask fabrication plants and the light-emitting diode assembly fabrication plants, defects are unavoidably generated on the objects to be processed by the failure during the manufacturing processes, the unstability of the quality control, or the obstacle or the failure of the equipment of manufacturing process. Therefore, the instant disclosure provides an intelligent critical area analysis (CAA) failure pre-diagnosis system and a method thereof for completing the analysis of a CAA failure risk of each of the layout region patterns in a design layout through intelligent pre-diagnosis method before the object is manufactured. Accordingly, the in-line random defects and systematic defects can be predicted rapidly and accurately to determine if these defects will lead to open or short failure on the object to be processed, thereby affecting the yield of the object. In addition, the user can manage (control) the defect yield in the fabrication plants under optimum efficiency and minimum time, and can change or modify the layout pattern in each of the higher failure risk design layout pattern areas on the object to be processed for achieving an optimum layout pattern and reducing the failure risk. For example, the user can reduce a high failure risk design layout pattern to a low failure risk design layout pattern, or reduce a low failure risk design layout pattern to a no-failure risk design layout pattern, thereby increasing the tolerance towards the defect of these areas. The object can be a wafer, a mask, a printed circuit board, a panel-display, a wafer bump, a package structure, a light-emitting diode or a solar cell. However, the instant disclosure is not limited thereto.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 1:
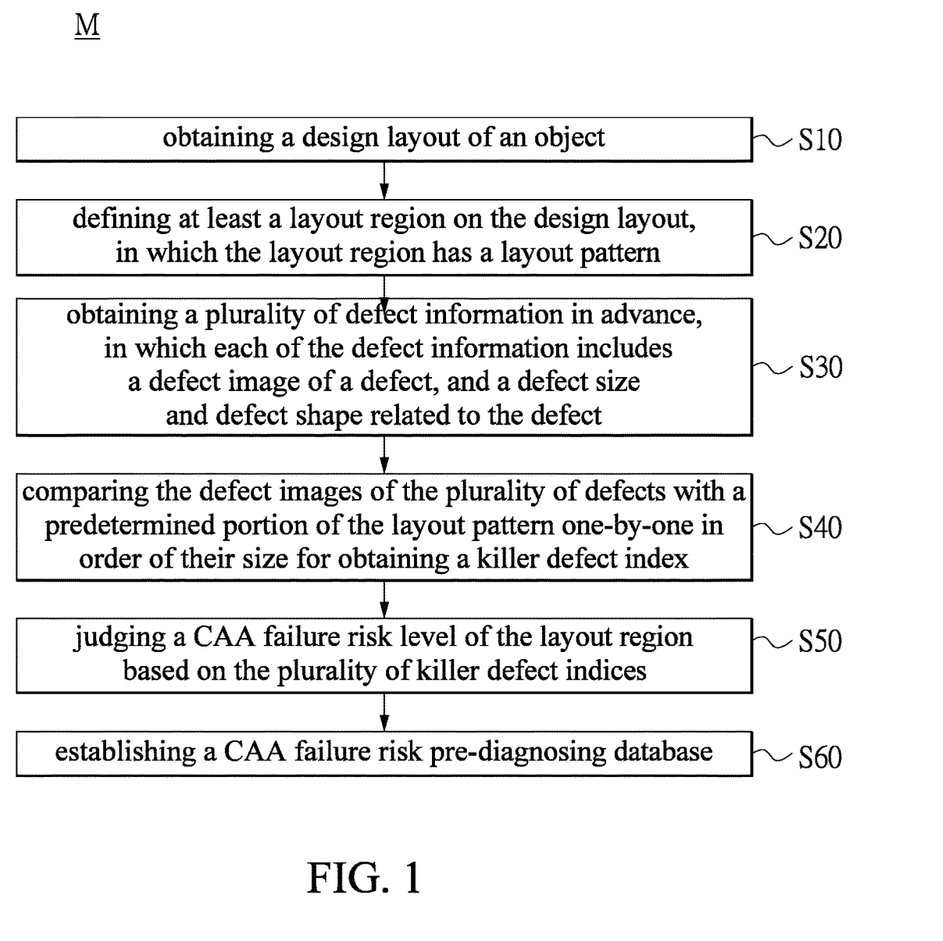
FIG. 1 is a flow diagram of the intelligent critical area analysis (CAA) failure pre-diagnosis method of the instant disclosure.

Reference is made to FIG. 1. FIG. 1 shows a flow diagram of an intelligent critical area analysis failure pre-diagnosis method of the instant disclosure. The CAA failure pre-diagnosis method M mainly includes the following steps: step S10, obtaining a design layout of an object; step S20, defining at least a layout region on the design layout, in which the layout region has a layout pattern; step S30, obtaining a plurality of defect information in advance, in which each of the defect information includes a defect pattern of a defect, and a defect size and defect shape related to the defect; step S40, comparing the defect patterns of the plurality of defects with a predetermined portion of the layout pattern one-by-one in order of their size for obtaining a killer defect index (KDI, described in detail in U.S. Pat. No. 8,312,401 of the applicant) related to each of the defects; step S50, judging a failure risk level of the layout region based on the plurality of killer defect indices; and step S60, establishing a CAA failure risk pre-diagnosing database.

Figure 2:
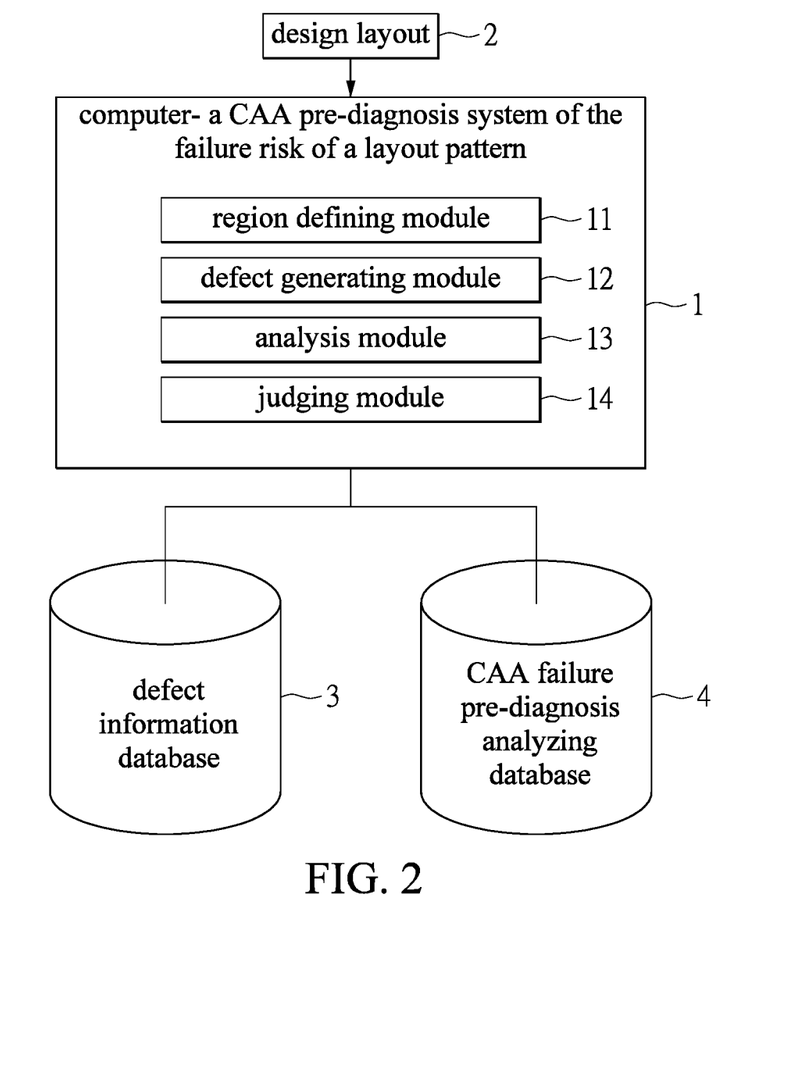
FIG. 2 is a block diagram of the intelligent critical area analysis (CAA) failure pre-diagnosis method of the instant disclosure.

Reference is made to FIG. 2. FIG. 2 shows a block diagram of the system of an embodiment of the instant disclosure. The system 1 is used to realize the CAA failure pre-diagnosis method M shown in FIG. 1. The system 1 includes a region defining module 11, a defect generating module 12, an analysis module 13 and a judging module 14. In practice, the CAA failure pre-diagnosis method M and the system 1 can be performed in a design house or in a manufacturing plant before or during a manufacturing process. For example, the design layout of an object can be provided by the design house to the manufacturing plant, and before providing the design layout, the design house can judge the tolerance towards the defects of different areas in the design layout by the CAA failure pre-diagnosis method M and the system 1. In another embodiment, after the manufacturing plant receives the design layout, the manufacturing plant uses the CAA failure pre-diagnosis method M and the system 1 for achieving the same object as above.

The CAA failure pre-diagnosis method M and the system 1 can be implemented by software or a combination of software and hardware. The CAA failure pre-diagnosis method M and the system 1 can be performed automatically on a single computer or a plurality of computers interacting with each other. Although the design layout of the object is exemplified as the complete design layout and the object is exemplified as a wafer, the instant disclosure is not limited thereto.

Figure 3:
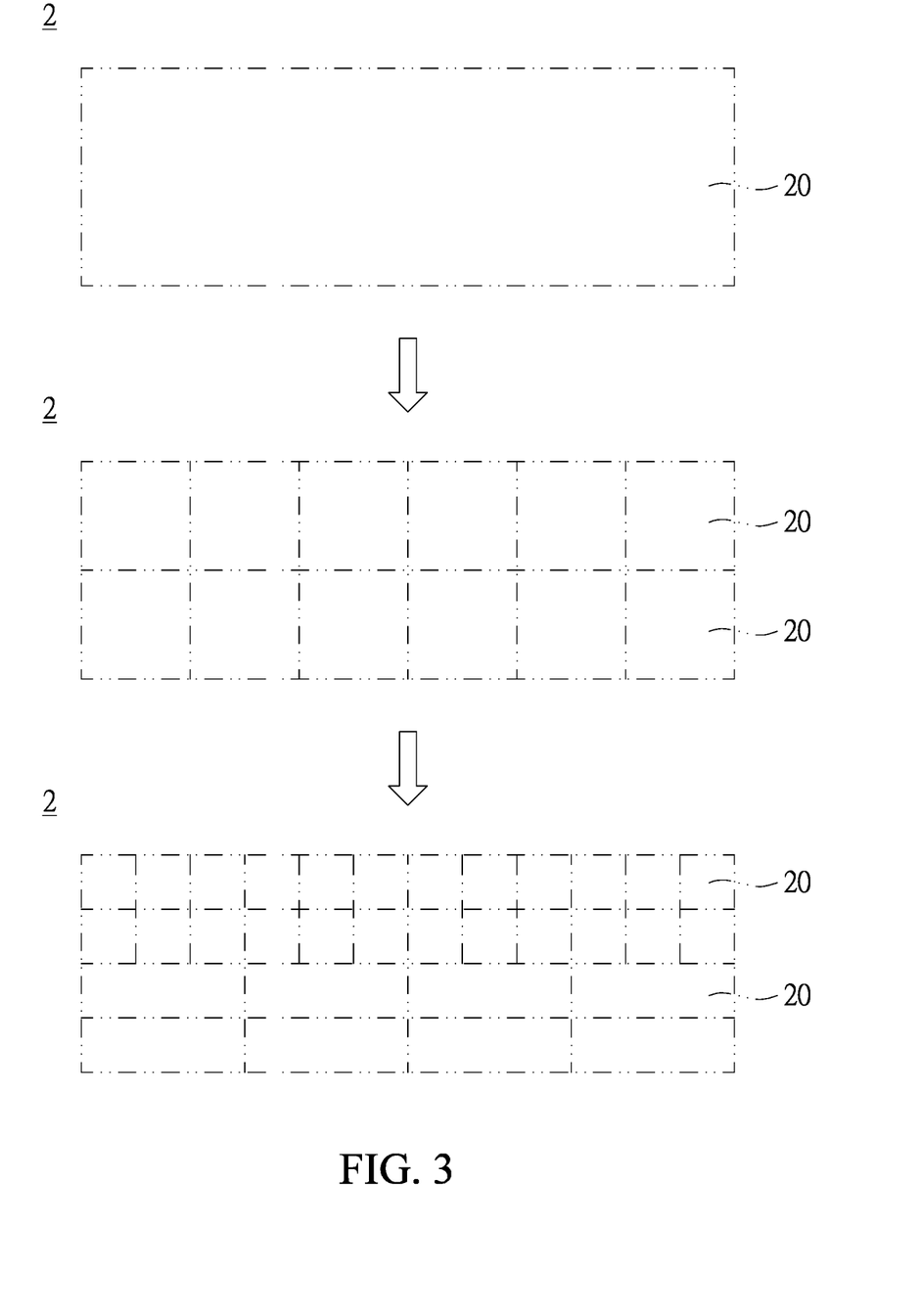
FIG. 3 is a schematic view of step S20 of the intelligent critical area analysis (CAA) failure pre-diagnosis method of the instant disclosure.

Referring to FIG. 3, in step S10, the design layout 2 is used to define the profile and structure of an object. The design layout 2 can be a design layout pattern file such as a graphic database system (GDS) of the IC design industry which records the geometric polygon shape, texts, labels and information of the design layout 2. Each layer of the design layout 2 can be modified or re-built. The format of the design layout 2 can be a GDSII format or an OASIS format. In practice, during the manufacturing process of the semiconductors or the IC chips by the manufacturing plant, the files in GDSII format made by computer aided design (CAD) are generally used since it is a generic format and can be interchangeable in the IC design-related applications. In addition, the files in an OASIS format can be stimulated by a semiconductor lithograph (such as optical proximity correction (OPC)) or can be generated by the profile design system/database of the CAD tool.

As shown in FIG. 2 to FIG. 6, in step S20, the region defining module 11 is used to perform the definition of the layout region 20. The size of the layout region 20 can be defined by the user according to actual needs, in which the layout region 20 has a layout pattern 21 (such as a pre-set circuit pattern). If a plurality of layout regions 20 are defined, the layout patterns 21 in the layout regions 20 can have the same or different pattern features.

The region defining module 11 can carry out pre-processing of the design layout 2. Specifically, the region defining module 11 divided the design layout 2 into a plurality of design layout units (not shown) in advance, in which each of the design layout units has at least a layout pattern 21. Afterward, the region defining module 11 categorizes the plurality of design layout units having an identical layout pattern 21 for forming a plurality of layout pattern groups. In practice, step S20 can be performed before or after the pre-processing of the design layout 2, and step S20 can build a database such as a system defect information database for storing a plurality of layout pattern groups with different pattern features and the coordinate areas corresponding thereto, or the two vertex coordinates on the diagonal axis of each of the pattern groups. The pre-processing of the design layout 2 is described in detail in the U.S. Pat. No. 8,312,401.

As shown in FIG. 4 to FIG. 9, in step S30, regarding each of the layout regions 21*a*~2*f*, the defect generating module 12 is used to generate the defect information of a plurality of defects D in a range having a specific dimension and to store the defect information in the defect information database 3 for determining the defect size which is tolerable to the layout pattern 21. Accordingly, the potential causation of the failure of a certain portion of the design layout 2 can be known. A plurality of defects D can have an identical size in one dimension such as the horizontal direction but different shapes in another dimension such as the vertical direction. For example, a plurality of defects having an identical size in one dimension such as the horizontal direction can have different shape ratios ranging from 1.0 to 10.0 in another dimension such as the vertical direction. In practice, the defect generating module 12 can utilize electronic design automation (EDA) tools to design the defect pattern (in GDSII format) of the plurality of defects D, or utilize an image processing process to design the defect pattern (in JPEG, PNG or TIF format) of the plurality of defects D.

Figure 4:
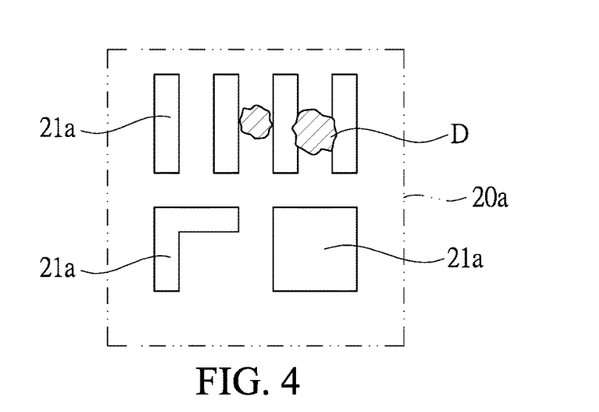
FIG. 4 to FIG. 10 are the schematic views of step S40 of the intelligent critical area analysis (CAA) failure pre-diagnosis method of the instant disclosure.

Referring to FIG. 4 to FIG. 9, in step S40, regarding each of the layout regions 20*a*~20*f*, a plurality of selected defects D can be sequentially mapped or overlapped to corresponded layout patterns 21*a*~21*f* in order of the defect size. Specifically, if the layout pattern 21*a* in any one layout region 20*a* includes a pattern with a small line width and a small spacing (as shown in FIG. 4), during the analysis of the killer defect index, i.e. CAA value of each of the defects D by the analysis module 13, the defect D with the smallest or a smaller size is compared with the layout 21*a*, i.e., with a higher critical area, and the killer defect index thereof shows that the defect D reaches a high risk failure level. Therefore, if the size of the defect D increases, the killer defect index still remains as a high risk failure level. The reason of this situation is that the defect D with a small size is more likely to overlap the layout pattern 21*a* and causes open or short circuit failure, and once an open or a short circuit is presented on the layout pattern, the yield of the object decreases. Accordingly, the layout region 20*a* is categorized as a high failure risk layout region.

Figure 5:
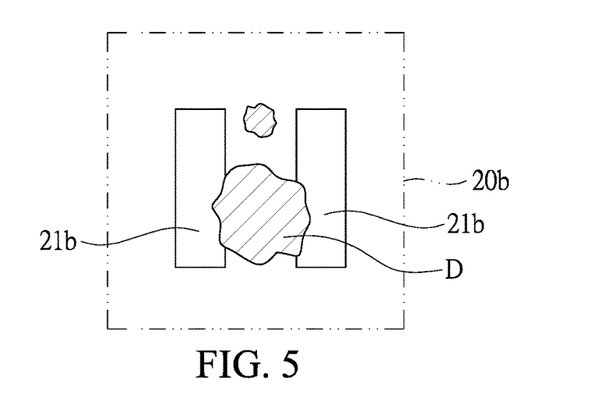

If a layout pattern 21*b* of another layout region 20*b* has a pattern with a second-large line width and a second-large spacing (as shown in FIG. 5), during the analysis of the killer defect index of the defects D by the analysis module 13 in order of size (from the smallest size to the largest size), the defect D with the smallest size or a smaller size is compared with the layout pattern 21*b*, and the killer defect index is 0 or a low risk killer defect index. In addition, a high risk killer defect index can be obtained only if comparing a medium-small size or a medium size defect D with the layout pattern 21*b*. As the size of the defect D increases, a high risk killer defect index will always be obtained. Accordingly, the layout region 20*b* is categorized as a medium failure risk layout region.

Figure 6:
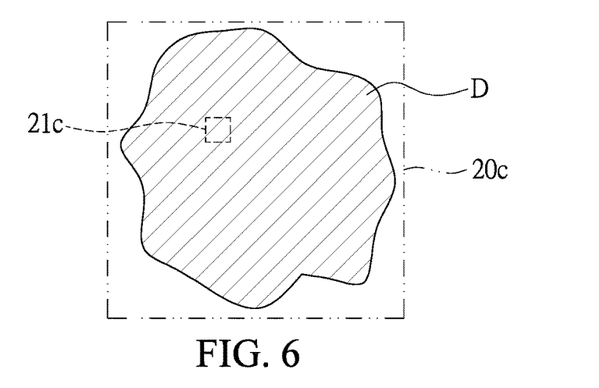
Figure 7:
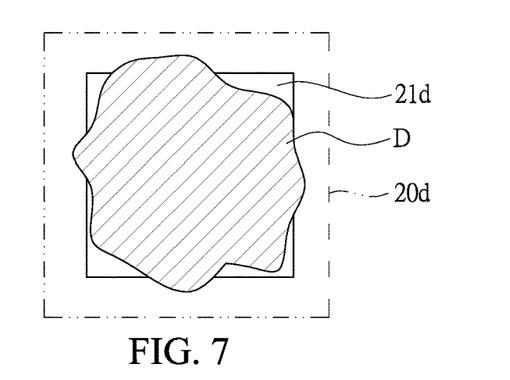

If the layout patterns 21*c*, 21*d* in another two layout regions 21*c*, 20*d* include separate small patterns (as shown in FIG. 6) or a pattern with a large line width or a large spacing (as shown in FIG. 7), during the analysis of the killer defect index of the defects D by the analysis module 13 in order of size (from the smallest size to the largest size), the defects D are compared with the layout patterns 21*c*, 21*d*, and the killer defect index is 0 or a low risk killer defect index. A high risk killer defect index may be only obtained by comparing a defect D with a relatively large size with the layout patterns 21*c*, 21*d*. Therefore, the layout regions 20*c*, 20*d* are low failure risk layout regions.

Figure 8:
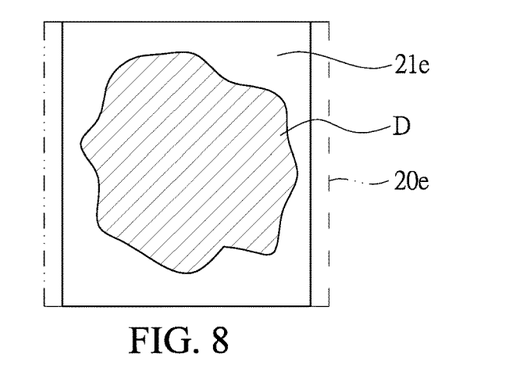
Figure 9:
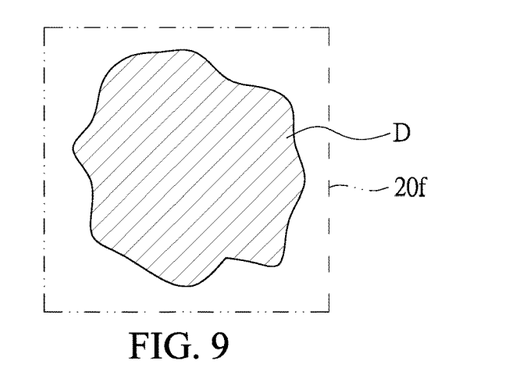

If the layout pattern 21*e* in another layout region 20*e* includes a pattern with an extremely large line width or an spacing (as shown in FIG. 8), during the analysis of the killer defect index of the defects D by the analysis module 13 in order of size (from the smallest size to the largest size), the defects D with different sizes are compared with the layout pattern 21*e*, the killer defect index is 0 or a negligible low risk killer defect index (even for the defect D with the largest size). Therefore, the layout region 20*e* is a no failure risk layout region. Similarly, if another layout region 20*f* includes no pattern (as shown in FIG. 9), during the analysis of the killer defect index of the defects D by the analysis module 13 in order of size (from the smallest size to the largest size), the killer defect index is 0 even for the defect D with the largest size. The layout region 20*f* is a no failure risk layout region.

Figure 10:
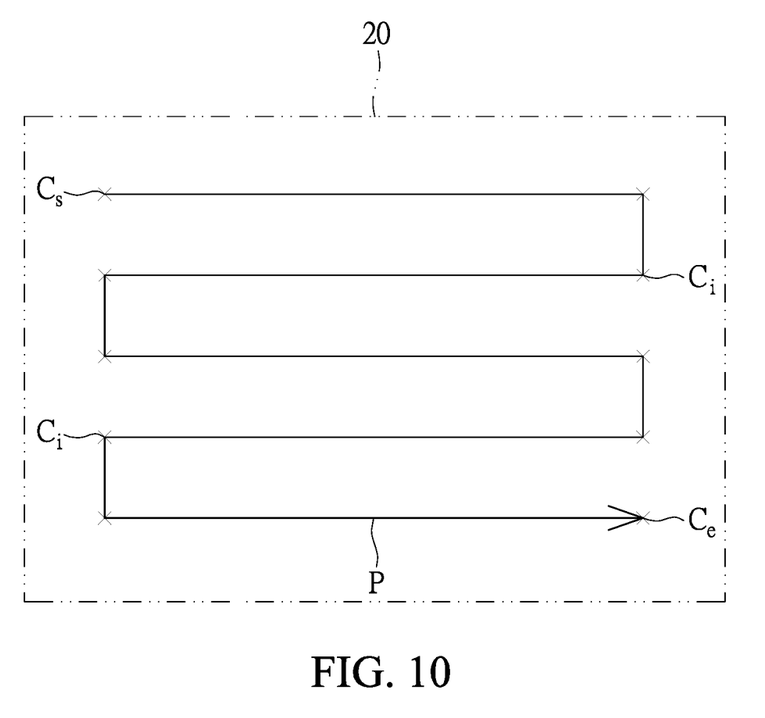

Referring to FIG. 10, in step S50, the analysis module 13 analyzes the defect size which is tolerable to all of the locations of the layout patterns (not shown) in each of the layout regions 20. Specifically, during the comparison between specific layout pattern with a plurality of defects related thereto (not shown) by the analysis module 13, the following two processes are mainly adopted: moving the defect patterns of the plurality of defects from a starting point coordinate $C_s$ to a final point coordinate $C_e$ in the layout region 20 along a specific path P, and comparing the defect patterns with a predetermined portion of the layout pattern at the starting point coordinate $C_s$, a plurality of location coordinates $C_i$ and the final point coordinate $C_e$ (including the error range thereof) respectively; or sequentially comparing the defect patterns of the plurality of defects D with a predetermined portion of the layout pattern at one of the starting point coordinate $C_s$, a plurality of location coordinates $C_i$ and the final point coordinate $C_e$ (the error range is included during the calculation of the killer defect index), and repeating the comparison between the other coordinates. Therefore, a killer defect index (KDI) of the selected defect towards each of the coordinates can be obtained, and the KDI is used to judge the probability that the layout pattern fails with a certain defect size/shape. For example, the probability of an open circuit, a short circuit or a conductivity loss of the pattern can be predicted.

Figure 11:
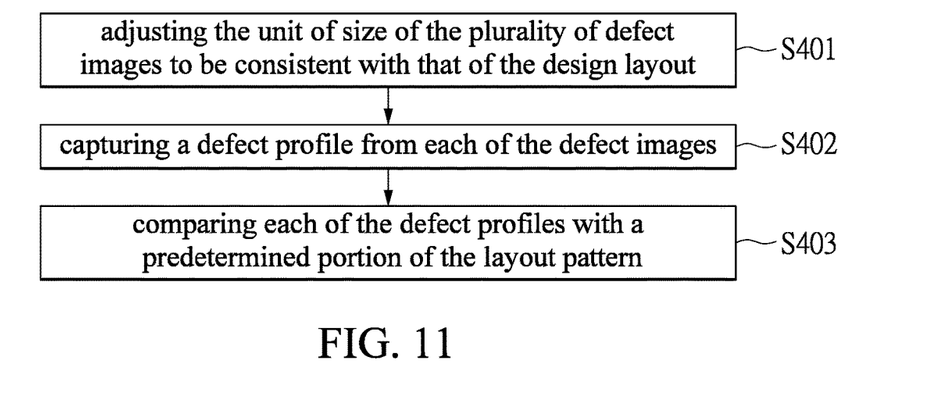
FIG. 11 is a flow diagram of the sub-steps of step S50 of the intelligent critical area analysis (CAA) failure pre-diagnosis method of the instant disclosure.

In the present embodiment, if the defect patterns are generated by an EDA tool, before performing step S50, the defect patterns of the plurality of selected defects only need to be adjusted to be consistent with the unit size of the design layout 2. In addition, referring to FIG. 11, if the defect patterns are generated by an image processing process, step S40 further includes: step S401, adjusting the unit of size of the plurality of defect patterns to be consistent with that of the design layout; step S402, capturing a defect profile from each of the defect patterns; and step S403, comparing each of the defect profiles with a predetermined portion of the layout pattern. The details of the comparison between the defect patterns and the layout patterns are described in U.S. Pat. No. 8,473,223.

Referring to FIG. 4 to FIG. 9, in step S60, the judging module 14 categorizes a plurality of defects into high risk killer defects, medium risk killer defects, low risk killer defects, negligible low risk killer defects and no risk defects (such as a dummy defect or a nuisance defect) according to KDI values of the layout patterns 21a-21c in one of the layout regions 20a-20c. In the present embodiment, a critical area analysis (CAA) process is introduced in the judging module 14, and the coordinate offset window is incorporated. The related techniques are described in U.S. Pat. No. 8,312,401. The KDI value obtained based on the CAA has a minimum value of 0 and a maximum value of 1. For example, a KDI value of 1 or a KDI value ranging from 0.7 to 1 represents that the defect is a high risk killer defect and is likely to cause failures (such as open or short circuit failure); a KDI value of 0 represents that the defect is a no risk defect which is unlikely to cause a failure; a KDI value ranging from 0.5 to 0.7 represents that the defect is a medium risk killer defect which has a relatively high probability to cause a failure; a KDI value ranging from 0.1 to 0.5 represents that the defect is a low risk killer defect; a KDI value lower than 0.1 represents that the defect is a negligible low risk killer defect which has a relatively low probability to cause a failure. It should be noted that the KDI values described above are only examples and the user can determine the definition of the KDI value based on the analysis between the defect and the yield of the object.

In addition, when analyzing the killer defect indices of the defects D towards all of the coordinates in order of their sizes (from the smallest one to the largest one) in any one of the layout regions 20a~20f, if the KDI value of the high risk killer defect index is achieved when the comparison is carried out on the defect D with the smallest or a smaller size, the failure risk level of this area is judged as a high failure risk (for example, the layout region 20a is a layout region with a high failure risk); if the KDI value of the high risk killer defect index is achieved only when the comparison is carried out on the defect D with a medium-small or a medium size, the failure risk level of this area is judged as a medium failure risk (for example, the layout region 20b is a layout region with a medium failure risk); if the KDI value of the high risk killer defect index is achieved only when the comparison is carried out on the defect D with a relatively large size, the failure risk level of this area is judged as a low failure risk (for example, the layout regions 20c, 20d are layout regions with a medium failure risk); and if the KDI value achieved is 0 or a negligible low risk killer defect even if the comparison is carried out on the defect D with the largest size, the failure risk level of this area is judged as no failure risk (for example, the layout regions 20e, 20f are layout regions with no failure risk).

The judging module 14 can obtain a defect yield for the manufacturing process related to the design layout based on the failure risk killer defect index of any one of the layout regions 20a~20f and a defect distribution density curve, in which the defect distribution density curve shows the probability or percentage of the occurrence of the defects with different sizes.

It should be noted that the design layout 2 provided by the design house can be used to timely diagnose all of the layout regions 20 in the design layout 2 with a high failure risk before the products are actually manufactured, and an EDA layout optimization tool can be used to modify/correct the layout patterns 21 in these layout regions 20 for reducing the failure risk of the layout regions 20 from high failure risk design layout pattern to low or medium failure risks design layout pattern, or from low failure risk design layout pattern to no failure risk design layout pattern, thereby increasing the overall tolerable defect size of these layout regions 20.

Figure 12:
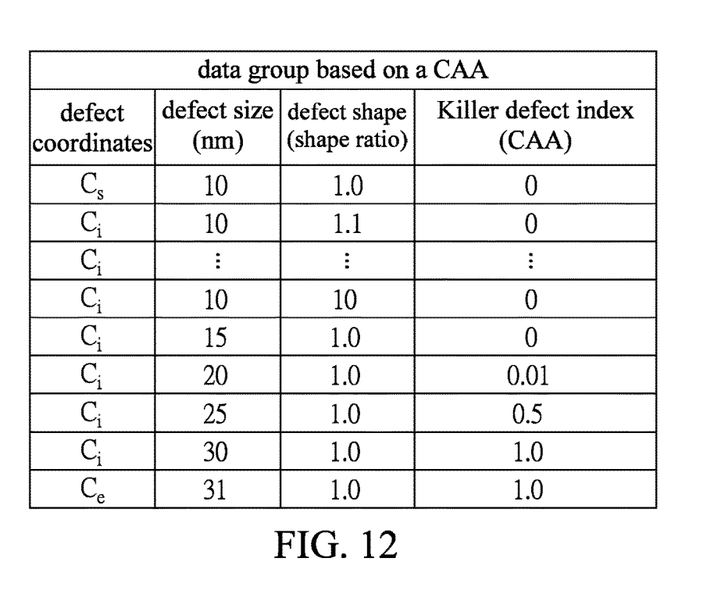
FIG. 12 and FIG. 13 are the schematic views of step S60 of the intelligent critical area analysis (CAA) failure pre-diagnosis method of the instant disclosure.
Figure 13:
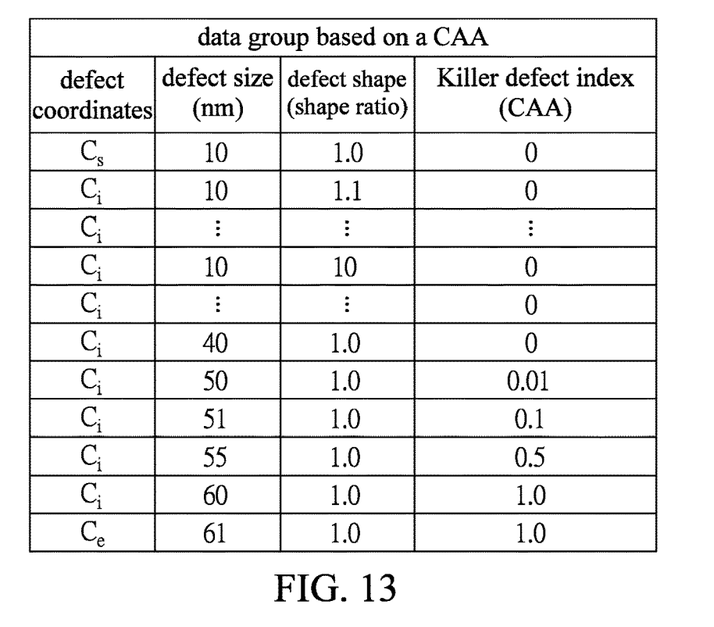

Referring to FIG. 3, FIG. 12 and FIG. 13, in step S60, a CAA failure pre-diagnosis analyzing database 4 is established mainly based on the analysis results obtained in step S50. The CAA failure pre-diagnosis analyzing database 4 stores a plurality of information groups based on critical area analysis of all of the layout regions 20 of the design layout 2 corresponding to the object, in which each of the information groups based on critical area analysis includes a plurality of target coordinates (the starting point coordinate, the location coordinates and the final point coordinate) in the corresponded layout region 20, the defect information of the plurality of selected defects and the KDI values, i.e., CAA values, of each of the defects corresponding to each of the target coordinates. Therefore, the detected defect of the object to be processed during different manufacturing steps can be filtered by the CAA failure pre-diagnosis analyzing database 4 established in advance to remove the non-killer defects (including dummy pattern defects, nuisance defects which are described in U.S. Pat. No. 8,312,401), and the CAA failure pre-diagnosis analyzing database 4 can identify the defects that will affect the yield of the object during the manufacturing process. Therefore, the speed of defect sampling is increased and the defect detecting efficiency is improved.

Figure 14:
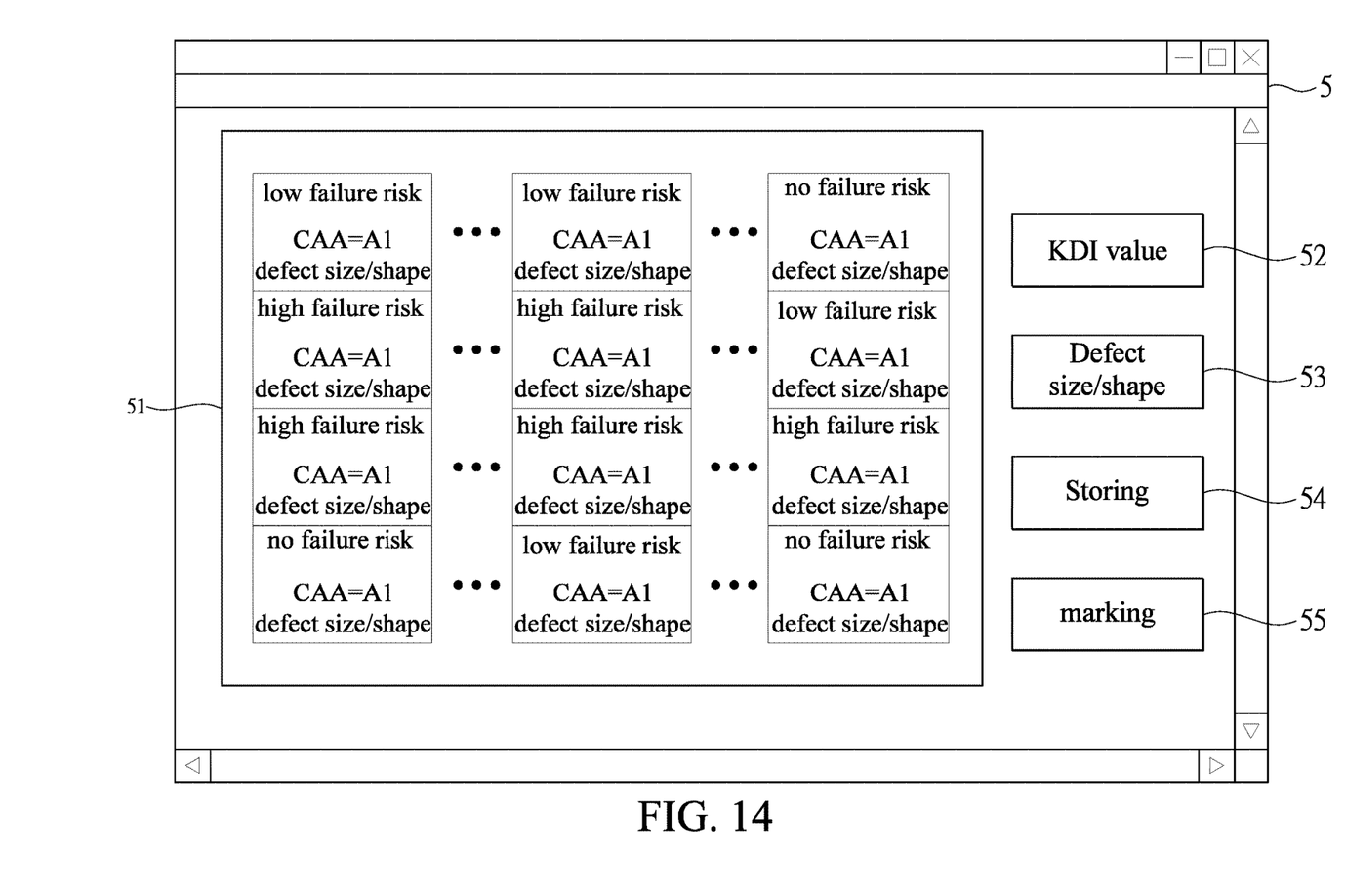
FIG. 14 is a schematic diagram of a user interface of the intelligent critical area analysis (CAA) failure pre-diagnosis method of the instant disclosure.

FIG. 14 shows a Graphical User Interface (GUI) realized by a computer system, such as a webpage or a graphical interface when initiating specific software. Referring to FIG. 14, a display window 51 displays the user interface, and a side of the display window 51 includes graphical icons for executing the function of the selection of the KDI values (icon 52), the selection of the defect size/shape (icon 53), storing (icon 54) and marking (icon 55). In practice, the CAA failure pre-diagnosis database can be used in combination with a layout graphics browser. By selecting the icons mentioned above through the user interface, all of the layout pattern with specific KDI values, defect size and shape ratio can be browsed.

In the present embodiment, the user can click the icons 52, 53 by a mouse or his/her finger to select a KDI value, a defect size and an shape ratio related to a defect shape for browsing all of the layout patterns corresponding to the KDI value, the defect size and the shape ratio. The action of selecting sample is executed by a program and all of the layout patterns corresponding to the conditions selected by the user in each of the layout regions 20 are shown in the display window 51. The user can then click on the icon 54 to create markings on the layout pattern 21 with interest (such as a layout pattern in a layout region with a high failure risk), and click on the icon 53 for storing the result of the selected sample. Therefore, the function of analyzing and browsing required by the design layout can be timely provided, and the user can carry out a debug process rapidly regarding the defect yield.

In summary, the intelligent critical area analysis failure pre-diagnosis system and method realized by hardware or software includes the technical features of "defining at least a layout region on a design layout; obtaining a plurality of defect data in advance; carrying out a critical area analysis (CAA) comparison between the plurality of defects and a predetermined portion of the layout pattern one-by-one in order of size; and judging a failure risk level of the layout region based on the result of the comparison". Therefore, the system and method provided by the instant disclosure can diagnose all of the layout regions with high, medium, low and no failure risk timely and predict rapidly and accurately if the in-line random defect and systematic defect will lead to open or short circuit failures, thereby preventing these failures affecting the yield of the object.

Accordingly, the defect yield in the manufacturing plant can be managed by the user with optimum efficiency and minimum time. In addition, the layout pattern in each of the layout regions with higher failure risk can be changed or modify for achieving an optimum layout pattern, and the layout patterns in each of the failure risk area can be reduced to a lower failure risk area level, thereby increasing the defect size which is tolerable to these layout regions.

In addition, the user can combine the result obtained by the CAA failure pre-diagnosis system or method with a defect distribution density curve for predicting the defect yield with higher accuracy through the following equation 1.

$$\begin{pmatrix} \text{failure} \\ \text{probability of} \\ \text{the defect} \\ \text{with a size} \end{pmatrix} = \begin{pmatrix} \text{Occurring} \\ \text{percentage of} \\ \text{the defect} \\ \text{with a size} \end{pmatrix} \times \left\{ \begin{bmatrix} \begin{pmatrix} \text{average of} \\ \text{probability of a high} \\ \text{risk } KDI \text{ of the} \\ \text{corresponding size} \end{pmatrix} \times \begin{pmatrix} \text{average area of layout} \\ \text{pattern with high risk} \\ KDI \text{ of the} \\ \text{corresponding size} \end{pmatrix} \end{bmatrix} \\ + \begin{bmatrix} \begin{pmatrix} \text{average of} \\ \text{probability of a} \\ \text{medium risk } KDI \text{ of} \\ \text{the corresponding} \\ \text{size} \end{pmatrix} \times \begin{pmatrix} \text{average area of layout} \\ \text{pattern with medium} \\ \text{risk } KDI \text{ of the} \\ \text{corresponding size} \end{pmatrix} \end{bmatrix} \\ + \begin{bmatrix} \begin{pmatrix} \text{average of} \\ \text{probability of a low} \\ \text{risk } KDI \text{ of the} \\ \text{corresponding size} \end{pmatrix} \times \begin{pmatrix} \text{average area of layout} \\ \text{pattern with low risk} \\ KDI \text{ of the} \\ \text{corresponding size} \end{pmatrix} \end{bmatrix} \right\}$$

Equation 1

The defect distribution density curve can provide the occurring probability or percentage of each of the defects of different sizes, and the failure risk pre-diagnosing database can provide the layout region corresponding to each of the defects with different sizes and certain failure risk and the sum of the areas thereof, i.e., the percentage of such defects occupying the entire design layout region. The occurring percentage of each of the defects of different sizes is multiplied by "the average of the killer defect indices of the high, medium and low failure risks multiplied by the percentage of the sum of the areas of the layout regions occupying the entire design layout region in which the layout region corresponds to the defects with high, medium and low failure risk, then adding the probability of the high, medium and low failure risks". Afterward, the predicted results of each of the defects with different sizes are added together for accurately predicting the defect yields with largest probability of each of the layers during the manufacturing process. Therefore, the defect yield with largest probability during the manufacturing process of the design layout can be predicted at the design state by adding the defect yields with the largest probability of each of the layers together.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. An intelligent critical area analysis failure pre-diagnosis system, comprising:

a region defining module for defining at least a layout region on a design layout of an object, wherein the layout region has a layout pattern;

a defect generating module for designing and generating a plurality of defect information in advance, wherein each of the defect information includes a defect pattern of a defect, and a defect size and a defect shape related to the defect; and an analysis module for analyzing a critical area for the defect pattern of each of the defects superposed with a predetermined portion of the design layout one-by-one in order of the defect size based on a critical area analysis (CAA), thereby obtaining a killer defect index related to each of the defects;

wherein each of the killer defect indices has a minimum value of 0 and a maximum value of 1, when the killer defect index is close to 1, the probability that the layout pattern fails is high, when the killer defect index is close to 0, the probability that the layout pattern fails is low;

wherein if the killer defect index obtained by analyzing any one of the defects having small size by the analysis module is a high risk killer defect index, a judging module judges a failure level of the layout region to be a high failure risk; if the killer defect index obtained by analyzing any one of the defects having small size or medium size by the analysis module is a high risk killer defect index, the judging module judges the failure level of the layout region to be a medium failure risk; if the killer defect index obtained by analyzing any one of the defects having large size by the analysis module is a high risk killer defect index, the judging module judges the failure level of the layout region to be a low failure risk; if the killer defect index obtained by analyzing any one of the defects by the analysis module is 0 or close to 0, the judging module judges the failure level of the layout region to be no failure risk.

2. The system according to claim 1, wherein the analysis module moves the plurality of defect patterns in the layout region from a starting point coordinate to a final point coordinate along a specific path one-by-one, and compares the plurality of defect patterns with the plurality of predetermined portions of the layout pattern at the starting point coordinate, the final point coordinate and a plurality of location coordinates between the starting point coordinate and the final point coordinate sequentially.

3. The system according to claim 1, wherein the analysis module compares the plurality of defect patterns at one of a starting point coordinate, a final point coordinate and a plurality of location coordinates between the starting point coordinate and the final point coordinate in the layout region with a predetermined portion of the layout pattern one-by-one, then compares the plurality of defect patterns at another one of the starting point coordinate, the final point coordinate and the plurality of location coordinate of the plurality of defect patterns with another predetermined portion of the layout pattern.

4. The system according to claim 1, further comprising a CAA failure risk pre-diagnosing database storing a data group corresponding to the layout region, the data group being established based on a critical area analysis, and the data group including the starting point coordinate, the final point coordinate, the plurality of location coordinates, the plurality of defect information and the plurality of killer defect indices.

5. The system according to claim 4, further comprising a user interface configured to enable a user to select a defect size, a defect shape and a killer defect index from the CAA failure risk pre-diagnosing database by the user interface for browsing the layout pattern matching the defect size, the defect shape and the killer defect index.

6. The system according to claim 1, wherein the judging module further obtains a defect yield related to a manufacturing process of the design layout based on a failure risk killer defect index of the layout region and a defect distribution density curve, wherein the defect distribution density curve shows a probability or percentage of the occurrence of the defects having different sizes.

7. An intelligent critical area analysis failure pre-diagnosis method, comprising:
   obtaining a design layout of an object;
   defining at least a layout region on the design layout, wherein the layout region has a layout pattern;
   designing and generating a plurality of defect information in advance, wherein each of the defect information includes a defect pattern of a defect, and a defect size and defect shape related to the defect; and
   analyzing a critical area for the defect patterns of the plurality of defects superposed with a predetermined portion of the layout pattern one-by-one in order of size based on a critical area analysis (CAA) for obtaining a killer defect index related to each of the defects;
   wherein each of the killer defect indices has a minimum value of 0 and a maximum value of 1, when the killer defect index is close to 1, the probability that the layout pattern fails is high, when the killer defect index is close to 0, the probability that the layout pattern fails is low;
   wherein a CAA failure risk level of the layout region obtained by the plurality of killer defect indices is categorized as high failure risk, medium failure risk, low failure risk and no failure risk; when the failure risk level of the layout region is judged as a high failure risk, the killer defect index obtained by analyzing the defect having a small size is a high risk killer defect index; when the failure risk level of the layout region is judged as a medium failure risk, the killer defect index obtained by analyzing the defect having a medium-small size or a medium size is a high risk killer defect index; when the failure risk level of the layout region is judged as a low failure risk, the killer defect index obtained by analyzing the defect having a large size is a high risk killer defect index; when the failure risk level of the layout region is judged as a no failure risk, the killer defect index obtained by analyzing any one of the defects is 0 or close to 0.

8. The method according to claim 7, wherein the step of comparing the defect patterns of the plurality of defects with the predetermined portion of the layout pattern further includes: moving the defect patterns of the plurality of defects from a starting point coordinate to a final point coordinate along a specific path, and comparing the plurality of defect patterns with the plurality of predetermined portions of the layout pattern at the starting point coordinate, the final point coordinate and a plurality of location coordinates between the starting point coordinate and the final point coordinate sequentially.

9. The method according to claim 7, wherein the step of comparing the defect patterns of the plurality of defects with the predetermined portion of the layout pattern further includes:
   comparing the plurality of defect patterns at one of a starting point coordinate, a final point coordinate and a plurality of location coordinates between the starting point coordinate and the final point coordinate in the layout region with a predetermined portion of the layout pattern one-by-one; and
   comparing the plurality of defect patterns at another one of the starting point coordinate, the final point coordinate and the plurality of location coordinate in the layout region with another predetermined portion of the layout pattern.

10. The method according to claim 7, wherein after the step of comparing the defect patterns of the plurality of defects with the predetermined portion of the layout pattern, further includes: establishing a CAA failure risk pre-diagnosing database storing a data group corresponding to the layout region, the data group being established based on a critical area analysis, and the data group including the starting point coordinate, the final point coordinate, the plurality of location coordinates, the plurality of defect information and the plurality of killer defect indices.

11. The method according to claim 7, further including: performing an optimized layout pattern correction on the layout pattern of any one of the layout regions with high failure risk by an electronic design automation (EDA) tool for reducing the failure risk level of the layout region from a high failure risk design layout pattern to a medium failure risk design layout pattern or a low failure risk design layout pattern, or reducing the failure risk level of the layout region from a low failure risk design layout pattern to a no failure risk design layout pattern.

12. The method according to claim 10, further including:
   selecting a defect size, a defect shape and a killer defect index from the CAA failure risk pre-diagnosing database by a user interface of a computer system; and
   browsing the layout pattern matching the defect size, the defect shape and the killer defect index by the user interface of the computer system.

13. The method according to claim 7, further including obtaining a defect yield related to a manufacturing process of the design layout based on a failure risk killer defect index of the layout region and a defect distribution density curve, wherein the defect distribution density curve shows a probability or percentage of the occurrence of the defects having different sizes.

* * * * *